United States Patent

[11] 3,586,343

| [72] | Inventor | Robert E. Reed<br>Kaukauna, Wis. |
|------|----------|----------------------------------|
| [21] | Appl. No. | 817,836 |
| [22] | Filed | Apr. 21, 1969 |
| [45] | Patented | June 22, 1971 |
| [73] | Assignee | Giddings & Lewis, Inc. |

[54] TOOL-ORIENTING ARRANGEMENT
4 Claims, 4 Drawing Figs.

[52] U.S. Cl............................................ 279/1 A,
90/11A, 279/90, 279/103
[51] Int. Cl............................................ B23b 31/10
[50] Field of Search............................ 279/103, 1
A, 1 ME, 89, 90, 91; 90/11.1; 77/3, 4; 29/568

[56] References Cited
UNITED STATES PATENTS

| 3,159,081 | 12/1964 | Erikson ........................ | 90/11 UX |
| 3,264,941 | 8/1966 | Miraglia ....................... | 90/11 |
| 3,332,142 | 7/1967 | Lehmkuhl et al.............. | 29/568 UX |

*Primary Examiner*—Andrew R. Juhasz
*Assistant Examiner*—James F. Coan
*Attorney*—Wolfe, Hubbard, Leydig, Voit & Osann

ABSTRACT: A shank and socket type of interfitting tool adapter and machine tool spindle having pins on the adapter and holes in the spindle to insure a particular angular orientation of the adapter relative to the spindle prior to interfitting of the parts and engagement of a multiple tooth type of driving clutch.

PATENTED JUN22 1971

3,586,343

INVENTOR.
ROBERT E. REED
BY
Wolf, Hubbard, Voit & Osann
ATTORNEYS.

3,586,343

TOOL-ORIENTING ARRANGEMENT

DESCRIPTION OF THE INVENTION

This invention relates generally to machine tools and more particularly concerns an arrangement of orienting tool carrying adapters to the machine tool spindle.

In U.S. Pat. No. 3,332,142, issued July 25, 1967 to Lehmkuhl et al., there is shown a vertical drilling and boring machine tool with automatic tool-changing apparatus. This particular tool-changing apparatus is relatively uncomplicated and yet well suited for rapid tool changing with positive coupling of the tool in the spindle. A factor contributing to this tool-changing efficiency is the fact that there is no attempt to maintain angular orientation between the tool adapters and the spindle. Thus, the tool adapters are held easily in the tool storage matrices, the transfer mechanisms handle the tools without regard for angular orientation, and multiple tooth clutch members are used to positively couple the tool to the spindle with very little angular jogging of the spindle being necessary to engage the clutch teeth.

The absence of angular orientation between spindle and tool is quite satisfactory for most jobs a machine like this is called upon to perform. It is occasionally desireable, however, as when backfacing, recessing or precision boring, to establish a given orientation between the spindle and a particular tool that, once set by the machinist, is maintained when the tool is again automatically transferred to the spindle.

Accordingly, it is the primary aim of the invention to provide a spindle-tool orienting arrangement that is completely compatible with a nonorienting tool-changing mechanism of the kind described above.

It is also an object of the invention to provide an orienting arrangement which is simple and economical, both as to the arrangement itself and in the sense that it requires little modification of an existing automatic tool-changing mechanism.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Figure 1:
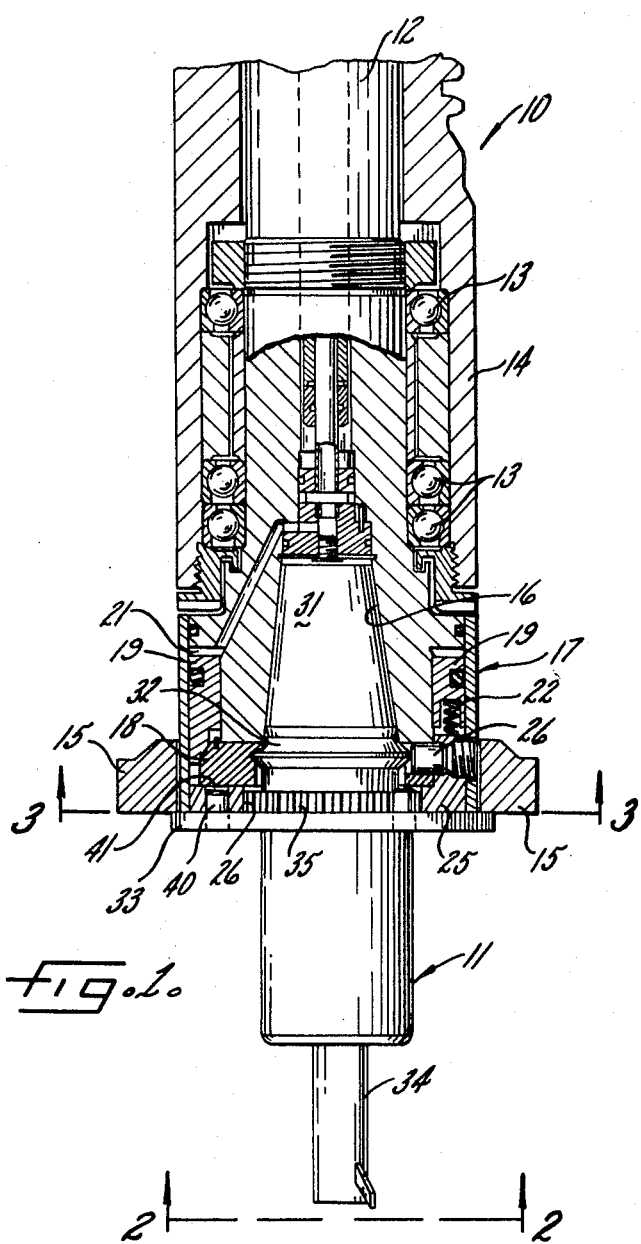
FIG. 1 is a fragmentary section of a machine tool spindle with a tool adapter mounted in the spindle.

Turning first to FIG. 1, there is shown a spindle assembly 10 mounting a tool adapter 11. The assembly 10 includes a spindle 12 journaled by bearings 13 in a sleeve 14 that can be translated linearly in a headstock 15, only a fragment of which is shown. The end of the spindle 12 is formed with a tapered socket 16 surrounded by a power chuck 17 that includes four jaws 18 and an annular actuating piston 19. Hydraulic pressure in a chamber 21 forces the piston 19 downwardly as seen in FIG. 1 and thus actuates the jaws 18 inwardly. Springs 22, only one of which is shown, return the piston 19 to an upward position. For driving the tool, an annular drive plate 25 is secured by pins 26 to the spindle 12, and is formed with a plurality of internal, gearlike clutch teeth 26.

The tool adapter 11 is formed with a tapered shank 31 proportioned to meet within the socket 16, an annular gripping ridge 32 which cooperates with the jaws 18, and an annular tool support flange 33. A tool 34 is secured to the end of the adapter 11. The adapter 11 also includes external gearlike clutch teeth 35 which, when the flange 33 abuts the drive plates 25, closely interfit with the teeth 26 and thus positively couple the adapter 11 for rotation with the spindle 12. As is made plain in the above-referred to U.S. PAT. No. 3,332,142, the flange 33 supports the adapter 11 in a tool matrix and provides the portion of the adapter which is engaged by tool transfer devices.

In accordance with the invention, a plurality of pins 40 are fixed on the flange 33 and disposed angularly about the flange axis so that the adapter 11 can be nontiltingly supported on the ends of the pins 40, and holes 41 are formed in the drive plate 25 to receive the pins 40, the pins and holes being arranged so that they interfit in only one angular position of the adapter 11 relative to the spindle 12. Preferably, there are three pins 40 press-fitted into holes formed 120° apart in the flange 33. The pins 40 are of equal length so that engagement of an annular surface with the ends of the pins will not tend to tilt the adapter 11. Since there are three pins 40, the holes 41 are also formed 120° apart in the drive plate 25.

Figure 2:
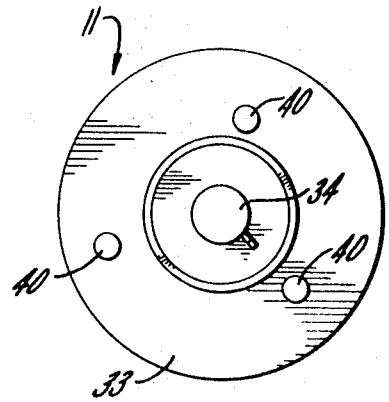
FIG. 2 is an elevation of the tool adapter taken approximately along the line 2—2 in FIG. 1.
Figure 3:
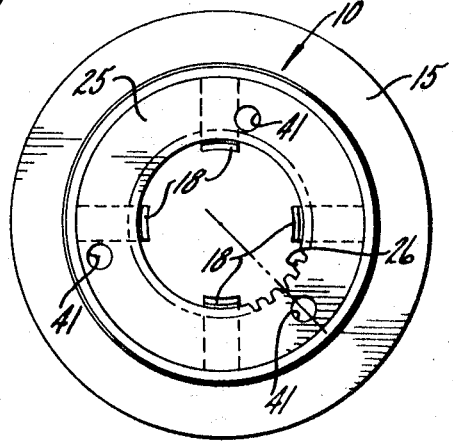
FIG. 3 is an elevation of the spindle end taken along the line 3—3 in FIG. 2.

The arrangement to cause interfitting of the pins 40 in the holes 41 at only one angular position of the adapter relative to the spindle consists in asymmetric spacing of the pins and holes about the axes of the plate and flange. In the exemplary arrangement shown, each pin 41 and its corresponding one of the holes 40 is spaced at a different distance from the axes of the plate and the flange than each of the other pins 41 and its hole. As seen in FIGS. 2 and 3, the upper right pin 40 and hole 41 are closest to the axes of the parts, the lower left pin and hole are furthest away from these axes, and the pin and hole at the lower right in these figures is at a middle distance. Thus, with the shank 31 entering the socket 16 and generally centering the adapter 11 with respect to the spindle 12, there is only one angular position of the adapter relative to the spindle which will allow the pins 40 to enter the holes 41. At any other angular position, the pins will strike the surface of the drive plate 25.

Figure 4:
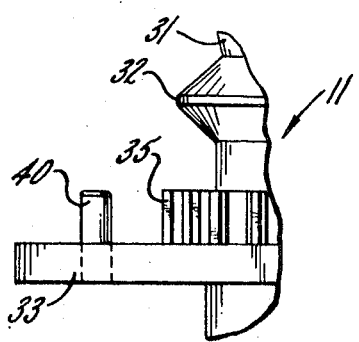
FIG. 4 is an enlarged fragmentary elevation of a portion of the tool adapter otherwise appearing in FIG. 1.

To facilitate entering of the pins 40 into the holes 41, the pins are slightly chamfered at their ends (see FIG. 4). Also, the holes 41 are slightly larger than the pins, preferably about one thirty-second of an inch in diameter larger in the case of the illustrated circular pins and circular holes, so that the pins 40 not only enter the holes 41 easily but, when entered, there is no driving action from the drive plate 25 to the adapter 11 through the pins 40. Rather, the pins 40 and the holes 41 simply insure that the driving clutch teeth 26, 35 go together in only one angular position, and tool drive is through the clutch teeth.

In operation with a tool transfer mechanism such as that shown in said U.S. PAT. No. 3,332,142, the tool adapter 11 is positioned in axial alignment with the spindle 12 whereupon relative movement between the spindle and the tool adapter occurs. The parts move together until the annular outer surface of the drive plate 25 strikes the ends of the pins 40. Because of the equal angular spacing of the pins 40, there is no tendency to tilt the tool adapter 11 as a result of this engagement. The spindle is then jogged through short increments of angular motion and this jogging action continues until the angular position is reached at which the pins 40 slip into their corresponding holes 41, whereupon the shank 31 is fully received within the socket 16, the teeth 35 interfit with the teeth 26 and the power chuck jaws 18 can be actuated to grip the tool adapter bridge 32.

It will be readily apparent that the presence of the holes 41 in the drive plate 25 in no way affects the manner in which the spindle assembly 10 receives a tool adapter whose angular orientation in not critical and which, therefore, has no pins 40. In such a case, relative movement between the spindle 12 and the tool adapter 11, with the tool adapter being held by the tool transfer mechanism, occurs until there is engagement between the teeth 26, 35. If the teeth do not immediately interfit, a very short jogging rotation of the spindle will bring the closely spaced teeth into alignment and result in full mounting of the tool adapter on the spindle.

It can therefore be seen that the tool orienting arrangement described is completely compatible with the nonorienting tool-changing mechanism of the kind disclosed in said U.S. PAT. No. 3,332,142. Since the tool-orienting arrangement consists of properly positioned pins and holes, it can be seen that it is simple and quite economical. It requires very little modification of an existing automatic tool-changing mechanism not provided with an orienting feature.

I claim as my invention:

1. In a machine tool having a driven spindle with a socket for receiving a tool-carrying adapter, the combination comprising, an annular drive plate on said spindle and surrounding said socket, a tool adapter formed to fit into said socket and having an annular flange which abuts said plate when the tool adapter is locked in said spindle socket, a plurality of annularly spaced clutch teeth on both said drive plate and said adapter, said clutch teeth being shaped to closely interfit and positively couple the adapter to said spindle when said flange and said plate abut, a plurality of pins fixed on said flange to extend axially thereof and disposed angularly about the axis of the flange so that the adapter can be nontiltingly supported on the ends of said pins, said drive plate having a plurality of holes formed axially therein to receive said pins in an angular position of said adapter relative to said spindle that permits said clutch teeth to interfit, said pins having chamfered ends to facilitate entry into said holes, said pins and said holes being asymmetrically arranged about said axes so that the pins and holes will meet in only one angular position of the adapter relative to the spindle, and said holes being sufficiently larger than said pins to prevent rotational drive from said spindle to said adapter through said pins when said clutch teeth are interfitted.

2. The combination of claim 1 in which each pin and its corresponding one of said holes is spaced from said axes at a different distance from the other pins and holes.

3. The combination of claim 1 in which there are three of said pins and three of said holes, each spaced 120° apart.

4. In a machine tool having a driven spindle member with a socket for receiving a tool-carrying adapter member, the combination comprising, positive drive means coupling said members, and orienting means connecting said members so that the adapter member is receivable in said spindle socket in only one angular position, said drive means and said orienting means being engageable upon relative axial movement of said members, said orienting means including an element projecting from said spindle member and a recess formed in said adapter member for receiving said element, the fit of said element in said recess allowing limited degree of rotational freedom between said members so that said orienting means is effective to orient and said drive means is effective to drive independently of said orienting means.